US005904881A

United States Patent [19]

Jegat et al.

[11] Patent Number: 5,904,881

[45] Date of Patent: May 18, 1999

[54] PROCEDURE FOR PREPARING A INCANDESCENT MATERIAL AND ITS USE IN HARD MANTLES FOR GAS LIGHTING OF PUBLIC PLACES

[75] Inventors: Alain Jegat, Seyssins; Cornélia Petrescu, Grenoble; René Bardin, Voreppe, all of France

[73] Assignee: Commissariat a l'Energie Atomique, Paris, France

[21] Appl. No.: 09/055,888

[22] Filed: Apr. 7, 1998

[30] Foreign Application Priority Data

Apr. 15, 1997 [FR] France ................................ 97 04618

[51] Int. Cl.[6] ............................ C09K 11/55; F21H 1/02; F21H 3/00

[52] U.S. Cl. ........................................ 252/492; 431/100

[58] Field of Search ............................ 252/492; 431/100

[56] References Cited

U.S. PATENT DOCUMENTS

| | | | |
|---|---|---|---|
| 359,524 | 3/1887 | Von Welsbach | 252/492 |
| 377,700 | 2/1888 | Von Welsbach | 252/492 |
| 399,174 | 3/1889 | Von Welsbach | 252/492 |
| 403,804 | 5/1889 | Von Welsbach | 252/492 |
| 463,470 | 11/1891 | Von Welsbach | 252/492 |
| 563,524 | 7/1896 | Von Welsbach | 252/492 |
| 574,862 | 1/1897 | Van Deth | 252/492 |
| 703,064 | 6/1902 | Hicks | 252/492 |
| 3,838,486 | 10/1974 | Millner et al. | 419/4 |
| 4,532,073 | 7/1985 | Cornu et al. | 252/492 |
| 4,533,317 | 8/1985 | Addison | 252/492 |
| 4,604,228 | 8/1986 | Perroud et al. | 252/492 |
| 5,124,286 | 6/1992 | Edgar | 501/492 |

FOREIGN PATENT DOCUMENTS

| | | |
|---|---|---|
| 2 518 218 | 6/1983 | France . |
| 2 551 178 | 3/1985 | France . |

*Primary Examiner*—Margaret Medley
*Attorney, Agent, or Firm*—Oblon, Spivak, McClelland, Maier & Neustadt, P.C.

[57] ABSTRACT

The present invention relates to a incandescent material formed from the following mixture of oxides (in moles):

50 to 70% zirconium oxide $ZrO_2$, 5 to 8% yttrium oxide $Y_2O_3$, 13 to 20% magnesium oxide MgO, 4 to 10% lithium oxide $Li_2O$, and 0.2 to 0.6% cerium oxide $CeO_2$, 0 to 25% potassium oxide $K_2O$, 0 to 1% tungsten oxide $WO_3$.

This material is suitable for producing hard mantles for gas lighting of public places.

12 Claims, 1 Drawing Sheet

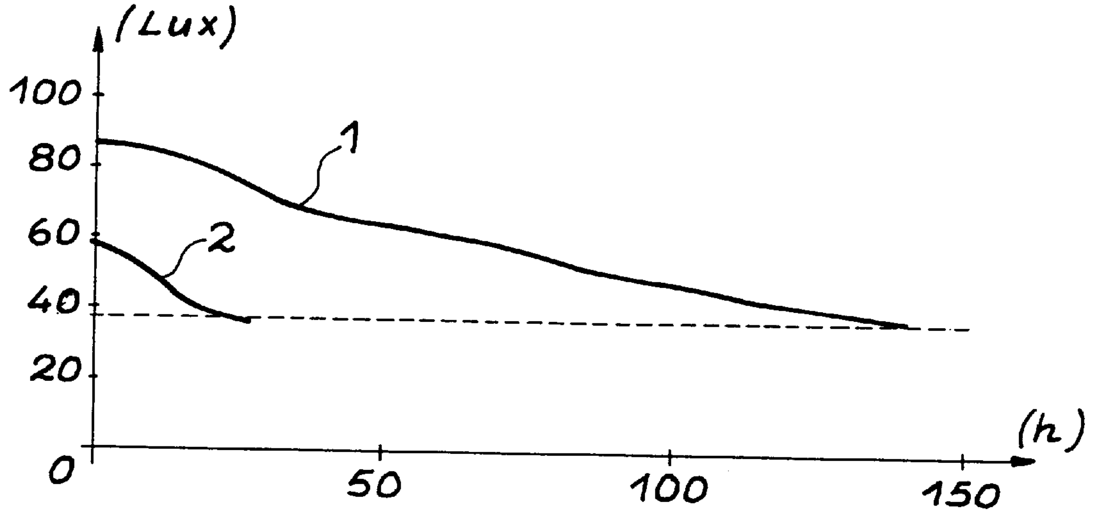
(Lux)
100
80
60
40
20
0
1
2
50
100
150
(h)

PROCEDURE FOR PREPARING A INCANDESCENT MATERIAL AND ITS USE IN HARD MANTLES FOR GAS LIGHTING OF PUBLIC PLACES

DESCRIPTION

1. Technical Field

The present invention relates to a non-radioactive incandescent material for use in producing hard incandescent mantles for gas lighting of public places.

The words "hard incandescent mantles" are used here to define lighting mantles whose characteristics and conditions of use are different from the mantles used for recreational gas lighting such as camping or garden use. These types of mantles are referred to below as soft mantles.

2. Background Art

Since the work of Carl Auer von Welsbach in 1893 incandescent lighting mantels have been produced using a similar principle, i.e. impregnating a flammable fabric with a solution containing a mineral that, once the fabric has burned off, forms a solid network that produces intense incandescent light when a gas flame is applied to it.

Soft mantles are sold in the form of impregnated fabric. The first time they are used the fabric burns off leaving a solid network that holds the shape of the fabric but which is rigid enough to withstand mechanical and thermal shocks.

Such mantles are used for recreational lighting such as camping or garden use, being fitted to bottles of butane gas. In the calcinated state their weight is between 60 and 90 mg and they are used at a gas pressure of 1 bar at a bottled butane flow rate of 31 g/h. The mechanical stresses to which they are subjected are mainly vibrations and shocks due to transportation, for example in caravans. They require a minimum mechanical resistance of at least 2 minutes at vibrations of 50 Hz. They have a minimum illuminance 37 lux.

In contrast, hard public lighting mantles are sold as hard sintered mantles that are already in the definitive shape, for example that of a bulb preshaped by initial burning to obtain a ceramic structure. This is done after fitting of a fastening system suitable for attaching them to the structure on which they are to be installed (gas nozzles for street lighting, for example).

Hard mantles are larger and heavier (130 to 160 mg) than soft mantles for leisure use (60 to 90 mg).

Their conditions of use are also different because they work on town gas at considerably lower pressures (28 mbar). They also require greater mechanical resistance, i.e. they should be able to resist 500 cycles on a cam-activated machine and have a service life of approximately 200 to 400 h. They must also have a minimum illuminance of 37 lux.

The different types of mantle are aimed at different markets: hard mantles are designed for static use, particularly the lighting of public places, and operate on gas distribution circuits at 28 mbar.

Their appearance and presentation are also different. The final appearance of soft mantles is determined by the need for the user to carry out the sintering by burning the mantle after fitting to the butane bottle; in hard mantles the sintering is done in the factory once the mantle has been fitted onto a ceramic ring, enabling it to be installed for use in the lighting position. Soft mantles cannot be used for public lighting since their need to be sintered and their fastening by binding makes them unusable in this type of application.

Hard mantles are specifically reserved for static lighting, one of their principal uses being the lighting of public places. This type of mantle can be found in the street lamps of towns such as Berlin, Strasbourg, Sarlat and Grenoble. This type of street lamp runs on natural gas with a low thermal capacity. 5 or 6 mantles are fitted onto a crown and they operate on low-pressure natural gas (approximately 2,800 Pa); in contrast, soft mantles run on butane or propane gas at a much higher pressure (approximately 0.1 Mpa).

The standard mineral used to impregnate the flammable fabric is based on thorium oxide $ThO_2$. However, there are several drawbacks to the production and use of thorium oxide-based mantles. Thorium is a naturally-radioactive element that emits $\alpha$ rays, has a half-life of $1.4.10^{10}$ years and fixes to give a variety of radioactive isotopes that are $\alpha$, $\beta$ or $\gamma$ emitters with a short half-life. These isotopes include the radioactive gas thoron 220 and lead 208.

Radioactive emissions are produced:

- during the storage phase of thoriated solutions intended for impregnating flammable fabric,
- during impregnation of the fabric, exposing operators to risk by inhalation,
- during manual assembly of the mantles, and
- during operations to change and destroy discarded mantles; ashes and unburned sections are dispersed.

For these reasons legislation has been introduced over several years to limit the use of this radioactive substance.

For several years therefore research has been conducted into various incandescent materials with the aim of producing lighting mantles that do not contain thorium.

French patent FR-A-2 551 178 describes soft incandescent mantles with improved qualities of mechanical resistance and durability. These mantles are produced using yttrium oxide to which cerium oxide has been added, with the possible addition of magnesium oxide or aluminum oxide to inhibit the growth of crystals.

U.S. Pat. No. 5,124,286 also discloses soft incandescent mantles that do not use thorium, relying instead of a mixture of zirconium oxide, yttrium oxide, erbium oxide and cerium oxide.

French patent FR-A-2 518 218 describes incandescent materials for soft mantles based on zirconium oxide and calcium oxide with possible addition of aluminum oxide and/or magnesium oxide and one or more oxides selected from the oxides of iron, manganese, praseodymium and/or cerium. However, these mixtures present a certain fragility due to the presence of magnesium oxide.

French patent FR-A-2 560 604 describes an incandescent material for soft mantles having better illuminance properties than the preceding material. This is achieved by replacing calcium oxide with a mixture of yttrium oxide and magnesium oxide. Average illuminance ranging from 35 to 45 lux is thereby obtained.

Soft mantles using these types of material have satisfactory characteristics but when they are used to produce hard mantles the mantles obtained do not have satisfactory illuminance characteristics (minimum 37 lux), shock resistance or service lives.

In fact, the initial lighting obtained using the hard mantle made of the incandescent material disclosed in French patent FR-A-2 560 604 is only 27 lux.

This reduction in lighting performance is due to:

- the increased (doubled) weight of the crystalline network of oxides after sintering of the hard mantle; greater mass requires greater caloric energy to obtain the same luminous energy,
- the pressure of the gas used; the flow rate and caloric capacity of the town gas used to power hard mantles are lower than those of butane used for soft mantles, and the need to obtain white light. Compared with soft mantles the whiteness characteristics of the light are greater due to the fact that several mantles are mounted on the same gas nozzle, the aim being to obtain similar results to that of an electric bulb.

Moreover, it is important for hard mantles to have the longest service life possible at illuminance greater than 37 lux. Users report that a current service life of from 200 to 400 hours can be obtained using thorium mantles at an illuminance of 37 lux.

Research has therefore aimed at obtaining composition of an incandescent material suitable for producing hard mantles for lighting public places that has satisfactory characteristics of lighting, mechanical solidity and service life.

DISCLOSURE OF THE INVENTION

The present invention relates precisely to an incandescent material suitable for use in producing hard mantles and having these characteristics.

According to the invention the incandescent material is formed of the following mixture of oxides (in moles):

50 to 70% zirconium oxide $ZrO_2$, 5 to 8% yttrium oxide $Y_2O_3$, 13 to 20% magnesium oxide MgO, 4 to 10% lithium oxide $Li_2O$, and 0.2 to 0.6% cerium oxide $CeO_2$.

In one variant embodiment the incandescent material also comprises potassium oxide and possibly tungsten oxide.

These materials respectively have the following compositions in moles:

1) 50 to 70% zirconium oxide $ZrO_2$,
   5 to 8% yttrium oxide $Y_2O_3$,
   13 to 20% magnesium oxide MgO,
   4 to 10% lithium oxide $Li_2O$,
   0.2 to 0.6% cerium oxide $CeO_2$, and
   0 to 25% potassium oxide $K_2O$, and
2) 50 to 70% zirconium oxide $ZrO_2$,
   5 to 8% yttrium oxide $Y_2O_3$,
   13 to 20% magnesium oxide MgO,
   4 to 10% lithium oxide $Li_2O$,
   0.2 to 0.6% cerium oxide $CeO_2$,
   0 to 25% potassium oxide $K_2O$, and
   0 to 1% tungsten oxide $WO_3$.

This composition for an incandescent material, which differs from that described in French patent FR-A-2 560 604 by its lower zirconium oxide content, the addition of lithium oxide and by the possible addition of tungsten oxide and potassium oxide, produces hard incandescent mantles that have significantly superior initial illuminance characteristics and a longer service life. The improved properties of the material are particularly due to the following properties of the component oxides:

the incandescence of zirconium, stabilization of the zirconium by the yttrium which gives the crystalline network improved resistance characteristics, whiter light due to the addition of magnesium oxide, and increased service life due to the addition of tungsten oxide.

Moreover, the addition of lithium and potassium makes it possible to use the emission properties of these oxides in the visible range 300 to 8,000 Å, mainly in the blue and violet area of the spectrum, to give whiter light.

The composition of the incandescent material of the invention contains the following molar percentages of metals:

38 to 60% of Zr, 8 to 14% of Y, 9 to 18% of Mg, 6 to 11% of Li, 0.2 to 0.4% of Ce, 0 to 36% of K, and 0 to 0.7% of W.

Hard mantles produced using this composition are very advantageous because they meet the requirements of providing illuminance of a minimum 37 lux as well as having good shock-resistance, service life and whiteness qualities.

The invention also relates to a procedure for preparing an incandescent material using the composition described above.

The procedure comprises the following stages:

a) preparing a solution of zirconium, yttrium, lithium, magnesium and cerium salts and adjusting the pH of the solution to a value of 0.6 to 1, the concentrations of salts in the solution being as follows (in moles):
   50 to 70% of $ZrO_2$,
   5 to 8% of $Y_2O_3$,
   13 to 20% of MgO,
   4 to 10% of $Li_2O$, and
   0.2 to 0.6% of $CeO_2$, b) impregnating a fabric made of flammable fibers with this solution, c) subjecting the impregnated fabric to combustion to eliminate the fabric and convert the salts to oxides.

The solution of stage a) may be prepared using different zirconium, yttrium, lithium, magnesium and cerium salts, for example chlorides or nitrates.

Nitrates are generally used because they are more soluble.

The total oxide concentration of the solution is adjusted to give good mechanical resistance of the mantle; it is preferably 1.3 to 1.5 mol/l.

The pH of the solution obtained from soluble salts, particularly nitrates, is very low, for example of the order of −0.5.

It is therefore necessary to adjust the pH to the required value, which lies between 0.6 and 1, particularly at 0.8.

Several techniques may be used to make this adjustment, which consists, in fact, of neutralizing acidity.

In a first embodiment of the procedure of the invention this may be achieved using ammonium carbonate. In this case the pH of the solution of stage a) is adjusted by adding ammonium carbonate or bicarbonate. The neutralization reaction is as follows:

$$HNO_3 + NH_4HCO_3 \longrightarrow H_2CO_3 \nearrow + NH_4NO_3$$

In stage c) of the procedure of the invention the ammonium nitrate produced during neutralization breaks down into $N_2O$ and $H_2O$ and no additional elements are introduced.

In a second embodiment of the procedure according to the invention the pH of the solution of stage a) is adjusted by neutralizing with potassium carbonate or bicarbonate. This gives the following reaction:

$$2HNO_3 + K_2CO_3 \rightarrow H_2CO_3 + 2KNO_3$$

In stage c) of the procedure according to the invention the potassium nitrate is converted into potassium oxide. This is advantageous since the addition of potassium facilitates improved illuminance with a whiter quality of light. This addition normally adds a molar percentage of between 20 and 25% potassium oxide into the oxide mixture.

In a variant of this second embodiment of the invention the neutralization is started by adding a solution of tungstic acid (soluble in strong alkalis such as potassium hydroxide) and the pH adjustment is finished using potassium carbonate or bicarbonate. The tungstic acid is then converted into tungsten oxide $WO_3$; the whiteness of the light can then be improved by adding $K_2O$ and the service life of the mantles extended by adding $WO_3$.

In this case the tungstic acid concentration in the KOH solution is such that it corresponds to introducing a molar percentage of between 0.2% and 1% of $WO_3$ to the oxides mixture.

In a third embodiment of the procedure of the invention the pH of the solution of stage a) is adjusted using an OH anion exchange resin.

Where the salts used are nitrates this adjustment corresponds to the following reaction:

$$R—OH+HNO_3 \rightarrow R—NO_3+H_2O$$

where R is the resin.

The nitrate resin $RNO_3$ is then subjected to a regeneration cycle using KOH where the reaction is as follows:

$$R—NO_3+KOH \rightarrow R—OH+KNO_3$$

Once the solution has been prepared and its pH adjusted it is used to impregnate a flammable fabric made of flammable filaments.

The flammable fabric used is viscose but may be any cotton, rayon, cellulose acetate or other type of natural or man-made filament such as those normally used to make hard incandescent mantles.

The weave of the fabric may be that of cloth, gauze, net or webbing. The thread should preferably be 300 DEN with a width of between 6.5 and 7 cm when flat and weigh 14 g/m.

After impregnation the fabric is shaped into a mantle and mounted on a fastening system suitable for the type of lamp on which it is to be installed.

This is done by taking a length of impregnated fabric woven into a tubular shape and placing it on a heat-stretching matrix. The woven tube is then stretched to form the mantel. The mantel is placed on a guide support used to fasten it with ceramic thread onto a ceramic fastening ring. The shaped mantle mounted on the ring is then burned with butane.

After combustion the mantle becomes hard and may be marketed for use in lighting public places.

Other characteristics and advantages of the present invention will be better understood from the following examples. The examples are non-limitative and refer to the attached FIGURE.

BRIEF DESCRIPTION OF THE DRAWING

The attached FIGURE is a diagram showing lighting as a function of time in two mantles according to the invention.

EXAMPLE 1

In this example an incandescent mantle is made using 1 kilogram of a solution with a total molar concentration of oxides of 1.4437 mol/l and a pH of +0.8. This is done by weighing:

600 grams of zirconium nitrate solution $(NO_3)_3$, $6H_2O$) having a 20% concentration of $ZrO_2$, 82.8 grams of yttrium nitrate ($Y_2(NO_3)_3$, $6H_2O$) containing 29.45% of $Y_2O_3$, 71.4 grams of magnesium nitrate containing 15.25% of MgO, 2.4 grams of cerium nitrate ($Ce(NO_36H_2O)$ containing 39.5% of $CeO_2$, 6.6 grams of lithium nitrate ($LiNO_3$) containing 43.23% of $Li_2O$.

This gives the following concentrations:

| | Mole oxide | Mole metal | % oxide | % metal |
|---|---|---|---|---|
| $ZrO_2$ | 0.974 | 0.974 | 67.5 | 59.45 |
| $Y2O_3$ | 0.108 | 0.216 | 7.5 | 13.18 |
| MgO | 0.270 | 0.270 | 18.7 | 16.48 |
| $CeO_2$ | 0.005 | 0.005 | 0.3 | 0.3 |
| $Li_2O$ | 0.0867 | 0.1734 | 6 | 10.6 |
| Total | 1.4437 | 1.6389 | | |

The resulting mixture has a pH of −0.7.

The pH of the solution is adjusted to a stable value of 0.8 by adding 65 g of ammonium bicarbonate $(NH_4)_2CO_3$, $6H_2O$ little by little and shaking to avoid even localized overrun of the critical pH value of 1.0. At pH=1 zirconium hydroxide starts to precipitate.

The solution is then made up to one kilogram with demineralized water.

A rayon fabric is then impregnated with this solution. A hard mantle is then constructed using the impregnated fabric; it is then burned and sintered to obtain a usable hard mantle. The illuminance of the mantle is determined using a standard burner onto which the mantle is fitted. The burner fitted with the mantle is placed inside a tube that is black inside and has a photocell connected to a luxmeter at the other end.

This procedure gives a yellowish illuminance of 50 to 53 and a service life of approximately 25 hours.

EXAMPLE 2

In this example the same procedure as example 1 is used to prepare the impregnation solution except that the pH is adjusted using an anion exchange resin, Lewattit MP62 OH resin. The resin is added to the solution little by little while shaking. The quantity required to adjust the pH, i.e. to take it from −0.5 to 0.8, is 500 g. The solution is shaken for 30 to 45 minutes before finally being made up to one kilogram with demineralized water.

The incandescent mantle is then prepared in the same way as in example 1. The illuminance characteristics are found to be similar to those of example 1 while the mechanical resistance and mesh integrity characteristics are improved. In this case the solution is more stable and is therefore more efficient in use.

EXAMPLE 3

In this example the same procedure as example 1 is used except that the pH of the solution is adjusted by adding potassium carbonate. The quantity of potassium carbonate required to change the pH of the solution from −0.75 to 0.8 is 60 g; i.e. 0.433 mol of $K_2O$. The potassium carbonate is added little by little while shaking. When the pH value of 0.8 is obtained the solution is then made up to one kilogram with demineralized water.

The concentrations of oxides and metals in the solution, expressed in molar percentages, are as follows:

| Oxide | % oxide | % metal |
|---|---|---|
| $ZrO_2$ | 51.9 | 38.9 |
| $Y2O_3$ | 5.75 | 8.62 |
| MgO | 14.38 | 10.78 |
| $CeO_2$ | 0.27 | 0.2 |
| $Li_2O$ | 4.6 | 6.92 |
| $K_2O$ | 23.1 | 34.58 |

The solution is then used to construct an incandescent mantle. This is done as described in example 1.

This mantle give illuminance of 60 to 65 lux with a whiter light than the previous example. This result is due to the present of potassium (23.1% in mol of $K_2O$).

EXAMPLE 4

In this example the same procedure as example 1 is used except that the pH of the solution is corrected using a tungstic acid solution before adjusting with potassium carbonate. This is done by dissolving 3.4 g of tungstic acid in 100 g of a 30% solution of KOH and shaking (i.e. 0.0136 mol of $WO_3$ and 0.26 mol of $K_2O$) at a temperature of 60° C.

The total concentration is 1.8767 moles of oxides or 2.5044 moles of metals.

This solution is then added to the solution prepared by mixing the different nitrates as in example 1. This takes the pH from −0.7 to a value of approximately −0.2. In order then to obtain the required pH of 0.8 approximately 25 g of potassium carbonate (0.188 mol of $K_2O$) is added while shaking. The solution is then made up to one kilogram with demineralized water.

The incandescent mantle is then prepared in the same way as in example 1.

After sintering he solid solution has the following composition:

1.4437 moles of (Zr, Y, Mg, Ce)+0.0136 moles of $WO_3$+ (0.26+0.188 moles of $K_2O$), i.e. 1.9053 moles of oxides representing 2.548 moles of metals.

Expressed as molar percentages this gives:

| Oxide | % oxide | % metal |
|---|---|---|
| $ZrO_2$ | 51.12 | 38.22 |
| $Y2O_3$ | 5.67 | 8.48 |
| MgO | 14.17 | 10.6 |
| $CeO_2$ | 0.26 | 0.2 |
| $Li_2O$ | 4.55 | 6.8 |
| $WO_3$ | 0.71 | 0.53 |
| $K_2O$ | 23.52 | 35.17 |

The illuminance obtained with this mantle is between 70 to 85 lux white light and a service life that is four times as long as that of example 3.

Illuminance is therefore improved due to the presence of $K_2O$ (23.5% mol).

The illuminance properties of the mantles produced in examples 3 and 4 are then tested as a function of time measured in hours.

The results obtained are given in FIG. 1 in which changes in illuminance are plotted against time.

In this FIGURE curve 1 relates to example 4 and curve 2 relates to example 3.

The straight dotted line represents the minimum illuminance required (37 lux) required for town street lighting.

It will be seen that the presence of tungsten and potassium is advantageous not only in terms of illuminance but also as regards service life; this is 135 hours for the mantle including W of example 4 instead of 30 hours for the mantle without tungsten of example 3.

For purposes of comparison we would note that the initial illuminance characteristics of a hard mantle made from the incandescent material of French patent FR-A-2 560 604 give only 27 lux.

The invention therefore makes it possible to achieve remarkably improved results.

We claim:

1. Incandescent material formed from the following mixture of oxides (in moles):

50 to 70% zirconium oxide $ZrO_2$, 5 to 8% yttrium oxide $Y_2O_3$, 13 to 20% magnesium oxide MgO, 4 to 10% lithium oxide $Li_2O$, 0.2 to 0.6% cerium oxide $CeO_2$, and optionally 0 to 25% potassium oxide $K_2O$, and/or 0 to 1% tungsten oxide $WO_3$.

2. A process for preparing an incandescent material comprising the following stages:

a) preparing a solution of zirconium, yttrium, lithium, magnesium and cerium salts and adjusting the pH of the solution to a value of 0.6 to 1, the concentrations of salts in the solution being as follows (in moles):

50 to 70% of $ZrO_2$, 5 to 8% of $Y_2O_3$, 13 to 20% of MgO, 4 to 10% of $Li_2O$, and 0.2 to 0.6% of $CeO_2$, b) impregnating a fabric made of flammable fibers with said solution, c) subjecting the impregnated fabric to combustion to eliminate the fabric and convert the salts to oxides.

3. The process of claim 2 wherein the salts are nitrates.

4. The process of claim 2 further comprising adjusting the pH of the solution of stage a) by adding ammonium carbonate or bicarbonate.

5. The process of claim 2 further comprising adjusting the pH of the solution of stage a) by adding potassium carbonate or bicarbonate.

6. The process of claim 2, further comprising adding a solution of tungstic acid and KOH to the solution of stage (a), then adjusting the pH of the resultant solution by adding potassium carbonate or bicarbonate, wherein the tungstic acid concentration in the tungstic acid solution is sufficient to introduce between 0.2 and 1 mol % of $WO_3$ to the oxides mixture.

7. The process of claim 2 wherein the pH of the solution of stage a) is adjusted using an $OH^-$ anion exchange resin.

8. The process of claim 3 wherein the pH of the solution of stage a) is adjusted using ammonium carbonate or bicarbonate.

9. The process of claim 3 wherein the pH of the solution of stage a) is adjusted using potassium carbonate or bicarbonate.

10. The process of claim 3, further comprising adding a solution of tungstic acid and KOH to the solution of stage (a), then adjusting the pH of the resultant solution by adding potassium carbonate or bicarbonate, wherein the tungstic acid concentration in the tungstic acid solution is sufficient to introduce between 0.2 and 1 mol % of $WO_3$ to the oxides mixture.

11. The process of claim 3 wherein the pH of the solution of stage a) is adjusted using an $OH^-$ anion exchange resin.

12. A hard gas mantle for lighting public places comprising an incandescent material formed from the following mixture of oxides (in moles):

50 to 70% zirconium oxide $ZrO_2$, 5 to 8% yttrium oxide $Y_2O_3$, 13 to 20% magnesium oxide MgO, 4 to 10% lithium oxide $Li_2O$, 0.2 to 0.6% cerium oxide $CeO_2$, and optionally 0 to 25% potassium oxide $K_2O$, and/or 0 to 1% tungsten oxide $WO_3$.

* * * * *